US011132180B2

(12) United States Patent
Polozov et al.

(10) Patent No.: US 11,132,180 B2
(45) Date of Patent: Sep. 28, 2021

(54) NEURAL-GUIDED DEDUCTIVE SEARCH FOR PROGRAM SYNTHESIS

(71) Applicant: Microsoft Technology Licensing, LLC, Redmond, WA (US)

(72) Inventors: Oleksandr Polozov, Redmond, WA (US); Sumit Gulwani, Sammamish, WA (US); Prateek Jain, Bangalore (IN); Ashwin Kalyan Vijayakumar, Bangalore (IN); Abhishek Mohta, Kolkata (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 16/019,280

(22) Filed: Jun. 26, 2018

(65) Prior Publication Data

US 2019/0212989 A1 Jul. 11, 2019

Related U.S. Application Data

(60) Provisional application No. 62/614,209, filed on Jan. 5, 2018.

(51) Int. Cl.
*G06F 8/33* (2018.01)
*G06N 3/08* (2006.01)
(Continued)

(52) U.S. Cl.
CPC .............. *G06F 8/33* (2013.01); *G06F 8/30* (2013.01); *G06F 8/35* (2013.01); *G06N 3/0427* (2013.01); *G06N 3/0445* (2013.01); *G06N 3/08* (2013.01)

(58) Field of Classification Search
CPC .... G06F 8/33; G06F 8/30; G06F 8/35; G06N 3/0427; G06N 3/0445; G06N 3/08
See application file for complete search history.

(56) References Cited

U.S. PATENT DOCUMENTS 6,327,699 B1 * 12/2001 Larus ................. G06F 11/3612
714/E11.209
9,002,758 B2 * 4/2015 Gulwani ............... G06F 40/151
706/12

(Continued)

OTHER PUBLICATIONS

Rishabh Singh et al., "Predicting a Correct Program in Programming by Example", 2015 (Year: 2015).*

(Continued)

*Primary Examiner* — Douglas M Slachta
(74) *Attorney, Agent, or Firm* — Schwegman Lundberg & Woessner, P.A.

(57) ABSTRACT

Systems, methods, and computer-executable instructions for guiding program synthesis includes receiving a specification that includes an input and output example. Programs are synthesized that meet the specification. During synthesizing each of the programs includes branching decisions. Each branching decision includes a plurality of paths. Synthesizing the programs comprises includes selecting a first score model, for a first branching decision. Each of the programs is scored using the first score model. The paths of the first branching decision are pared based on the score. One the paths is selected. A synthesized program that meets the specification is returned. The synthesized program includes the one of the paths.

14 Claims, 4 Drawing Sheets

(51) Int. Cl.
  *G06N 3/04* (2006.01)
  *G06F 8/35* (2018.01)
  *G06F 8/30* (2018.01)

(56) References Cited

U.S. PATENT DOCUMENTS

| | | | | |
|---|---|---|---|---|
| 9,021,416 | B2* | 4/2015 | Grechanik | G06F 8/36 |
| | | | | 707/708 |
| 9,501,549 | B1* | 11/2016 | Wang | G06F 16/951 |
| 9,552,335 | B2* | 1/2017 | Gulwani | G06F 8/30 |
| 9,558,245 | B1* | 1/2017 | Gao | G06F 16/2465 |
| 9,940,106 | B2* | 4/2018 | Kalai | G06N 20/00 |
| 10,079,713 | B2* | 9/2018 | Phadke | H04L 41/0663 |
| 10,474,478 | B2* | 11/2019 | Sivertson | G06N 7/005 |
| 10,795,645 | B2* | 10/2020 | Mohamed | G06N 3/08 |
| 2008/0282108 | A1* | 11/2008 | Jojic | G06F 8/436 |
| | | | | 714/26 |
| 2008/0301655 | A1* | 12/2008 | Gulwani | G06F 8/433 |
| | | | | 717/156 |
| 2009/0077542 | A1* | 3/2009 | Chou | G06F 8/75 |
| | | | | 717/132 |
| 2012/0011152 | A1* | 1/2012 | Gulwani | G06F 16/258 |
| | | | | 707/771 |
| 2013/0290319 | A1* | 10/2013 | Glover | G06F 16/24578 |
| | | | | 707/723 |
| 2013/0346982 | A1* | 12/2013 | Kalai | G06N 5/025 |
| | | | | 718/100 |
| 2014/0040869 | A1* | 2/2014 | Park | G06F 11/3612 |
| | | | | 717/133 |
| 2014/0108305 | A1* | 4/2014 | Gulwani | G06F 40/151 |
| | | | | 706/12 |
| 2014/0325472 | A1* | 10/2014 | Fige | G06F 8/35 |
| | | | | 717/106 |
| 2015/0143339 | A1* | 5/2015 | Rajanna | G06F 8/43 |
| | | | | 717/123 |
| 2017/0083295 | A1* | 3/2017 | Nagato | G06T 5/00 |
| 2017/0161027 | A1* | 6/2017 | Singh | G06F 40/16 |
| 2018/0032864 | A1* | 2/2018 | Graepel | G06N 3/0454 |
| 2018/0103052 | A1* | 4/2018 | Choudhury | H04L 63/1425 |
| 2018/0336453 | A1* | 11/2018 | Merity | G06N 3/0445 |
| 2019/0005603 | A1* | 1/2019 | Chen | G06T 1/20 |
| 2019/0034785 | A1* | 1/2019 | Murray | G06N 3/105 |
| 2019/0042210 | A1* | 2/2019 | Gaunt | G06N 3/0481 |
| 2019/0171422 | A1* | 6/2019 | Udupa | G06F 8/31 |
| 2019/0171438 | A1* | 6/2019 | Franchitti | G06F 16/9538 |
| 2019/0197154 | A1* | 6/2019 | Cohen | G06K 9/344 |
| 2019/0324730 | A1* | 10/2019 | Gulwani | G06F 8/30 |

OTHER PUBLICATIONS

Alur, et al., "Syntax-Guided Synthesis", In Proceedings of Formal Methods in Computer-Aided Design, Oct. 20, 2013, 25 Pages.
Balog, et al., "Deepcoder: Learning to write programs", In Proceedings of International Conference on Learning Representations, Apr. 24, 2017, pp. 1-19.
Bosnjak, et al., "Programming with a differentiable Forth interpreter", In Proceedings of the 34th International Conference on Machine Learning, Aug. 6, 2017, 18 Pages.
Cai, et al., "Making neural programming architectures generalize via recursion", In Proceedings of International Conference on Learning Representations, Apr. 24, 2017, pp. 1-20.
Clausen, Jens, "Branch and bound algorithms—principles and examples", In Thesis of University of Copenhagen, Mar. 12, 1999, pp. 1-30.
Devlin, et al., "RobustFill: Neural Program Learning under Noisy I/O", In Proceedings of the 34 th International Conference on Machine Learning, Aug. 6, 2017, 18 Pages.
Ellis, et al., "Learning to Learn Programs from Examples: Going Beyond Program Structure", In Proceedings of International Joint Conference on Artificial Intelligence, Aug. 19, 2017, 8 Pages.
Gaunt, et al., "TERPRET: A Probabilistic Programming Language for Program Induction", In Journal of Computing Research Repository, Aug. 2016, pp. 1-50.
Graves, et al., "Neural Turing Machines", In Journal of Computing Research Repository, Oct. 2014, pp. 1-26.
Gulwani, Sumit, "Automating string processing in spreadsheets using input-output examples", In Proceedings of the 38th annual ACM SIGPLAN-SIGACT symposium on Principles of programming languages, Jan. 26, 2011, pp. 317-330.
Gulwani, et al., "Program Synthesis", In Journal of Foundations and Trends in Programming Languages, vol. 4, Issue 1-2, Jul. 11, 2017, 33 Pages.
Hochreiter, et al., "Long Short-Term Memory", In Journal of Neural Computation, vol. 9, Issue 8, Nov. 15, 1997, pp. 1735-1780.
Kaiser, et al., "Neural GPUs learn algorithms", In Journal of Computing Research Repository, Nov. 2015, pp. 1-9.
Le, et al., "FlashExtract: A Framework for Data Extraction by Examples", In Proceedings of the ACM Principles of Programming Languages, vol. 49, Issue 6, Jun. 9, 2014, 12 Pages.
Loos, et al., "Deep network guided proof search", In Proceedings of 21st International Conference on Logic for Programming, Artificial Intelligence and Reasoning, May 7, 2017, pp. 1-20.
Manna, et al., "Toward automatic program synthesis", In Journal of Communications of the ACM, vol. 14, Issue 3, Mar. 1971, pp. 151-165.
Parisotto, et al., "Neurosymbolic program synthesis", In International Conference on Learning Representations, May 2, 2016, pp. 1-14.
Polozov, et al., "FlashMeta: a Framework for Inductive Program Synthesis", In Proceedings of the ACM SIGPLAN International Conference on Object-Oriented Programming, Systems, Languages, and Applications, Oct. 25, 2015, pp. 107-126.
Reed, et al., "Neural programmer-interpreters", In Journal of Computing Research Repository, Nov. 2015, pp. 1-12.
Rolim, et al., "Learning syntactic program transformations from examples", In Proceedings of the 39th International Conference on Software Engineering, May 20, 2017, pp. 404-415.
Seide, et al., "CNTK: Microsoft's Open-Source Deep-Learning Toolkit", In Proceedings of the 22Nd ACM SIGKDD International Conference on Knowledge Discovery and Data Mining, Aug. 13, 2016,, p. 2135
Singh, et al., "Predicting a correct program in programming by example", In Proceedings of International Conference on Computer Aided Verification, Jul. 18, 2015, pp. 1-17.
Torlak, et al., "Growing solver-aided languages with Rosette", In Proceedings of the ACM international symposium on New ideas, new paradigms, and reflections on programming & software, Oct. 29, 2013, pp. 135-151.
Udupa, et al., "TRANSIT: Specifying Protocols with Concolic Snippets", In Proceedings of 34th ACM SIGPLAN Conference on Programming Language Design and Implementation, Jun. 16, 2013, pp. 1-10.
Waldinger, et al., "PROW: A Step Toward Automatic Program Writing", In Proceedings of the 1st international conference joint on Artificial intelligence, May 7, 1969, pp. 241-252.
Zaremba, et al., "Learning Simple Algorithms from Examples", In Proceedings of the 33rd International Conference on Machine Learning, Jun. 19, 2016, pp. 1-12.

* cited by examiner

NEURAL-GUIDED DEDUCTIVE SEARCH FOR PROGRAM SYNTHESIS

PRIORITY CLAIM

This application claims the benefit of priority to U.S. Provisional Patent Application Ser. No. 62/614,209, filed Jan. 5, 2018, and entitled "NEURAL-GUIDED DEDUCTIVE SEARCH FOR PROGRAM SYNTHESIS". The above-identified provisional application is incorporated herein by reference in its entirety.

BACKGROUND

Automatic synthesis of programs that satisfy a given specification is a classical problem in AI. Recently, this area has gathered widespread interest, mainly spurred by the emergence of a sub-area, Programming by Examples (PBE). A PBE system synthesizes programs that map a given set of example inputs to their specified example outputs. Such example-based specifications may be easily provided by end users without programming skills. A PBE system is usually evaluated on three key criteria: (a) correctness: whether the synthesized program satisfies the specification, (b) generalization from few examples: whether the program produces the desired outputs on unseen inputs, and (c) performance: synthesis time.

Current PBE systems may be symbolic: based on enumerative or deductive search: or statistical based on data-driven learning to induce the most likely program for the specification. Symbolic systems are designed to produce a correct program by construction using logical reasoning and domain-specific knowledge. They also produce the intended program with few input-output examples, sometimes with just a single example. However, they require significant engineering effort and their underlying search processes struggles with real-time performance, which is critical for user-facing PBE scenarios.

In contrast, statistical systems do not rely on specialized deductive algorithms, which makes their implementation and training easier. However, they lack in two critical aspects. First, they require a lot of training data and so are often trained using randomly generated tasks. As a result, induced programs can be fairly unnatural and fail to generalize to real-world tasks with a small number of examples. Second, purely statistical systems, such as RobustFill, do not guarantee that the generated program satisfies the specification. Thus, solving the synthesis task requires generating multiple programs with a beam search and post-hoc filtering, which defeats real-time performance.

DETAILED DESCRIPTION

Figure 1:
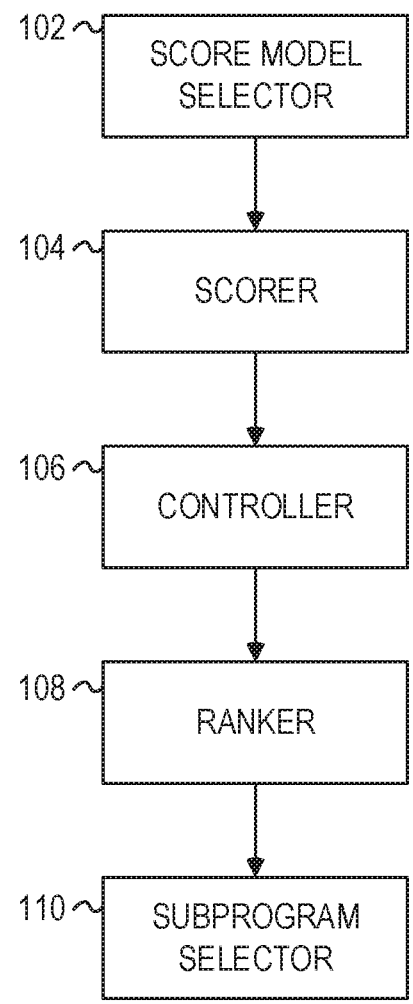
FIG. 1 is a system diagram for guiding real-time program synthesis in accordance with respective examples.

Synthesizing user-intended programs from a small number of input-output examples is a challenging problem with several important applications like spreadsheet manipulation, data analysis and code refactoring. Existing synthesis systems either completely rely on deductive logic techniques that are extensively hand-engineered or on purely statistical models that need massive amounts of data, and in general fail to provide real-time synthesis on challenging benchmarks. Described herein is a neural guided deductive search (NGDS), which is a hybrid synthesis technique that combines features of both symbolic logic techniques and statistical models. Thus, NGDS produces programs that satisfy the provided specifications by construction and generalize well on unseen examples, similar to data-driven systems. The NGDS techniques described herein effectively utilize the deductive search framework to reduce the learning problem of the neural component to a supervised learning setup. Further training may be done on sparingly available real-world data while still leveraging recurrent neural network encoders. In experiments using real-world customer scenarios to synthesize accurate programs up to a 10× speed-up was accomplished compared to state-of-the-art systems.

Some of the effectiveness of NGDS stems from the following three key observations. The symbolic foundation of NGDS is deductive search. It is parameterized by an underlying domain-specific language (DSL) of target programs, specified as a context-free grammar. Learning may proceed by recursively applying production rules of the DSL to decompose the initial synthesis problem into smaller sub-problems and further applying the same search technique on them. One observation is that most of the deduced sub-problems do not contribute to the final best program and therefore, may be eliminated a priori using a statistical model which obtains considerable time savings in the search process.

Since program synthesis is a sequential process wherein a sequence of decisions (selections of DSL rules) collectively construct the final program, a reinforcement learning setup may be used. However, a second observation is that deductive search is Markovian—it generates independent sub-problems at every level. This brings at least three benefits enabling a supervised learning formulation: (a) a dataset of search decisions at every level over a relatively small set of PBE tasks contains an exponential amount of information about the DSL promoting generalization, (b) such search traces can be generated and used for offline training, (c) separate models may be learned for different classes of sub-problems (e.g., DSL levels or rules), with relatively simpler supervised learning tasks.

Another observation is that speeding up deductive search while retaining its correctness or generalization has a close integration of symbolic and statistical approaches via an intelligent controller. This intelligent controller may be based on the "branch & bound" technique from combinatorial optimization. Thus, the resulting DSL-parameterized algorithm integrates (i) a deductive search, (ii) a statistical model that predicts a priori, the generalization score of the best program from a branch, and (iii) a controller that selects sub-problems for further exploration based on the model's predictions.

In various experiments, NGDS was evaluated on the string transformation domain, building on top of program synthesis using examples (PROSE), a commercially successful deductive synthesis framework for PBE. It represents one of the most widespread and challenging applications of PBE and has shipped in multiple mass-market tools. In these experiments, NGDS was trained and validated on 375 scenarios obtained from real-world customer tasks. NGDS produced intended programs on 68% of the scenarios despite using only one input-output example. In contrast, state-of-the-art neural synthesis techniques learned intended programs in only 16-33% of the scenarios and took ≈10× more time. Moreover, NGDS matches the accuracy of baseline PROSE while providing a speed-up of up to 10× over challenging tasks.

In an example, a branch-and-bound optimization based controller is used that exploits deep neural network based score predictions to select grammar rules efficiently. A program synthesis algorithm combines key traits of a symbolic and a statistical approach to retain desirable properties like correctness, robust generalization, and real-time performance A program synthesis problem may be defined over a domain-specific language (DSL). A DSL is a restricted programming language that is suitable for expressing tasks in a given domain, but small enough to restrict a search space for program synthesis. For instance, typical real-life DSLs with applications in textual data transformations often include conditionals, limited forms of loops, and domain-specific operators such as string concatenation, regular expressions, and date/time formatting. DSLs for tree transformations such as code refactoring and data extraction include list/data-type processing operators such as Map and Filter, as well as domain-specific matching operators. Formally, a DSL $\mathcal{L}$ is specified as a context-free grammar, with each non-terminal symbol N defined by a set of productions. The right-hand side of each production is an application of some operator $F(N_1, \ldots, N_k)$ to symbols of $\mathcal{L}$. All symbols and operators may be strongly typed. Table 1 shows a subset of the Flash Fill DSL that is used as a running example in this disclosure.

TABLE 1

// Nonterminals
@start string transform := atom | Concat(atom, transform);
string atom := ConstStr(s)
    | let string x = std.Kth(inputs, k) in Substring(x, pp);
Tuple<int, int> pp := std.Pair(pos, pos) | RegexOccurrence(x, r, k);
int pos := AbsolutePosition(x, k) | RegexPosition(x, std.Pair(r, r), k);
// Terminals
@input string[ ] inputs; string s; int k; Regex r.

The task of inductive program synthesis is characterized by a specification. A specification $\varphi$ may be a set of m input-output constraints $\{\sigma_i \leadsto \psi_i\}_{i=1}^{m}$, where $\sigma$ is an input state that is a mapping of free variables of the desired program P to some correspondingly typed values. At the top level of $\mathcal{L}$, a program (and its expected input state) has only one free variable—the input variable of the DSL (e.g., inputs shown in Table 1). Additional local variables are introduced inside $\mathcal{L}$ with a let construct. $\psi$ is an output constraint on the execution result of the desired program P ($\sigma_i$). At the top level of $\mathcal{L}$, when provided by the user. $\psi$ is usually the output example, e.g., the expected result of P ($\sigma_i$). However, other intermediate constraints may arise during the synthesis process. For instance, $\psi$ may be a disjunction of multiple allowed outputs. The overall goal of program synthesis is thus: given a specification $\varphi$, find a program P in the underlying DSL $\mathcal{L}$ that satisfies $\varphi$, i.e., its outputs P ($\sigma_i$) satisfy all the corresponding constraints $\psi_i$.

As an example, consider the task of formatting a phone number. $\leadsto$ characterized by the specification $\varphi$={inputs: ["(612) 8729128"]} $\leadsto$ "612-872-9128". This example has a single input-output example, with an input state a containing a single variable input and its value which is a list with a single input string. The output constraint is simply the desired program result.

The most likely desired/intended program from the limited specification likely extracts (a) the part of the input enclosed in the first pair of parentheses, (b) the $7^{th}$ to $4^{th}$ characters from the end, and (c) the last 4 characters, and then concatenates all three parts using hyphens. In an example DSL, this program corresponds to:

Concat(SubStr$_0$(RegexPosition(x, ⟨"(", ε⟩, 0), RegexPosition(x, ⟨ε, ")"⟩, 0)), ConstStr("−"), SubStr$_0$(AbsolutePosition(x, −8), AbsolutePosition(x, −5)), ConstStr("−"), SubStr$_0$(AbsolutePosition(x, −5), AbsolutePosition(x, −1))

where ε is an empty regular expression, SubStr$_0$(pos$_1$, pos$_2$) is an abbreviation for "let x=std.Kth(inputs, 0) in Substring (x, <pos$_1$, pos$_2$>)", and <•> is an abbreviation for std.Pair.

However, there are many other programs in the DSL that also satisfy $\varphi$. For instance, all occurrences of "8" in the output may be produced via a subprogram that simply extracts the last character. For example, the fourth character in the output from the one input/output example could be set to being the same as the last character. Such a program, however, overfits to $\phi$ and is bound to fail for other inputs where the last character and the $4^{th}$ one differs.

As shown in the example above, input/output examples for typical real-life problems will likely be severely underspecified. A DSL like Flash Fill may contain up to $10^{20}$ programs that satisfy a given specification that contains one to three input-output examples. Therefore, a big challenge lies in finding a program that not only satisfies the provided input-output examples but also generalizes to unseen inputs.

To accounts for such a large number of programs, the synthesis process may interleave search and ranking phases. The search phase finds a set of specification-satisfying programs in the DSL. The ranking phase then selects top programs ordered using a domain-specific ranking function h: $\mathcal{L} \times \Sigma \rightarrow \mathbb{R}$ where $\Sigma$ is the set of all input states. The ranking function takes as input a candidate program P∈ $\mathcal{L}$ and a set of input states $\vec{\sigma} \in \Sigma^{\rightarrow}$ where $\vec{\sigma}$ equals the inputs in the given specification and any available unlabeled inputs, and produces a score for P's generalization.

TABLE 2

// Nonterminals
@start string transform := atom | Concat(atom, transform);
string atom := ConstStr(s)
    | let string x = std.Kth(inputs, k) in Substring(x, pp);
Tuple<int, int> pp := std.Pair(pos, pos) | RegexOccurrence(x, r, k);
int pos := AbsolutePosition(x, k) | RegexPosition(x, std.Pair(r, r), k);
// Terminals
@input string[ ] inputs; string s; int k; Regex r/

Table 2 shows a subset of the Flash Fill DSL, which is used as a running example in this disclosure. Every program takes as input a list of strings inputs, and returns an output string, a concatenation of atoms. Each atom is either a constant or a substring of one of the inputs (x), extracted using some position logic. The RegexOccurrence position logic finds the $k^{th}$ occurrence of a regular expression (regex) r in x and returns its boundaries. Alternatively, start and end positions may be selected independently either as absolute indices in x from left or right (AbsolutePosition) or as the $k^{th}$ occurrence of a pair of regexes surrounding the position (RegexPosition).

The implementation of the ranking function h expresses a subtle balance between program generality, complexity, and behavior on available inputs. For instance, in Flash Fill h penalizes overly specific regexes, prefers programs that produce fewer empty outputs, and prioritizes lower Kolmogorov complexity. In modern PBE systems like PROSE, h is usually learned in a data-driven manner from customer tasks. The problem of inductive program synthesis may be summarized as follows, given a DSL $\mathcal{L}$, a ranking function h, a specification $\varphi = \{\sigma_i \leadsto \psi_i\}_{i=1}^m$, optionally a set of unlabeled inputs $\vec{\sigma}_u$, and a target number of programs K, let $\vec{\sigma} = \vec{\sigma}_u \cup \{\sigma_i\}_{i=1}^m$. The goal of inductive program synthesis is to find a program set $S=(P_1, \ldots, P_K) \subset \mathcal{L}$ such that every program in S satisfies $\varphi$, and the programs in S generalize best: $h(P_i, \vec{\sigma}) \geq h(P, \vec{\sigma})$ for any other $P \in \mathcal{L}$ that satisfies $\varphi$.

A deductive search strategy for program synthesis explores the grammar of $\mathcal{L}$ top-down—iteratively unrolling the productions into partial programs starting from the root symbol. Following the divide-and-conquer paradigm, at each step the search strategy reduces the synthesis problem to smaller subproblems defined over the parameters of the current production. Formally, given a specification $\varphi$ and a symbol N, a deductive search strategy, such as the one used by PROSE, computes the set Learn(N, $\varphi$) of top programs with respect to h using two guiding principles:

1. If N is defined through n productions N:= $F_1(\ldots) | \ldots | F_n(\ldots)$, PROSE finds a $\varphi$-satisfying program set for every $F_i$, and unites the results, i.e., Learn(N, $\varphi$)=$\cup_i$ Learn($F_i(\ldots), \varphi$).

2. For a given production N:=F ($N_1, \ldots, N_k$), PROSE spawns off k smaller synthesis problems Learn($N_j, \varphi_j$), $1 \leq j \leq k$ wherein PROSE deduces necessary and sufficient specs $\varphi_j$ for each $N_j$ such that every program of type $F(P_1, \ldots, P_k)$, where $P_j \in $Learn($N_j, \varphi_j$), satisfies $\varphi$. The deduction logic (called a witness function) may be domain-specific for each operator F. PROSE then again recursively solves each subproblem and unites a cross-product of the results.

As another example, consider a specification $\varphi$="Yann"-v-"Y.L" on a transform program. Via the first production transform:=atom, the only $\varphi$-satisfying program is ConstStr ("Y.L"). The second production on the same level is Concat (atom, transform). A necessary and sufficient specification on the atom sub-program is that it should produce some prefix of the output string. Thus, the witness function for the Concat operator produces a disjunctive specification $\varphi_a$={"Yann" $\leadsto$ "Y" $\leadsto$ "Y."}. Each of these disjuncts, in turn, induces a corresponding necessary and sufficient suffix specification on the second parameter: $\varphi_{t1}$= {"Yann" $\leadsto$ ".L"}, and $\varphi_{t2}$={"Yann" $\leadsto$ "L"}, respectively. The disjuncts in $\varphi_a$ will be recursively satisfied by different program sets: "Y." can only be produced via an atom path with a ConstStr program, whereas "Y" may also be extracted from the input using many Substring logics (their generalization capabilities vary).

The above-mentioned principles create a logical nondeterminism where multiple alternatives in a search tree may need to be explored. As such, non-determinism arises at every level of the DSL with potentially any operator, and the search tree (and the resulting search process) grows exponential in size. While all the branches of the tree by construction produce programs that satisfy the given specification, most of the branches do not contribute to the overall top-ranked generalizable program. During a deductive search, PROSE has limited information about the programs potentially produced from each branch, and therefore, cannot estimate a programs quality. The entire tree, therefore, may be unnecessarily explored. Instead of using a deductive search, a neural-guided search algorithm that predicts the best program scores from each branch would allow certain branches to be omitted. Accordingly, the search process may be more efficient in terms of processing power and memory.

Consider an arbitrary branching moment in the top-down search strategy of PROSE. For example, let N be a nonterminal symbol in $\mathcal{L}$, defined through a set of productions $N:=F_1(\ldots) | \ldots | F_n(\ldots)$, and let $\varphi$ be a specification on N, constructed earlier during the recursive descent over $\mathcal{L}$. A conservative way to select the top k programs rooted at N (as defined by the ranking function h), i.e., to compute Learn(N, $\varphi$), is to learn the top k programs of kind $F_i(\ldots)$ for all $i \in [k]$ and then select the top k programs overall from the union of program sets learned for each production. Naturally, exploring all the branches for each nonterminal in the search tree is computationally expensive.

Rather than exploring all the branches for each nonterminal, a data-driven method to select an appropriate production rule $N:=F_i(N_1, \ldots, N_k)$ that would most likely lead to a top-ranked program may be used. To this end, the current specification p may be used to determine an "optimal" rule. Finding such an optimal rule might seem unintuitive that even without exploring a production rule and finding the best program in the corresponding program set, the optimality of the rule may be determined. However, by understanding $\phi$ and its relationship with the ranking function h, a prediction regarding the intended branch in many real-life scenarios may be made.

As an example, consider a specification $\varphi$= {"alice" $\leadsto$ "alice@iclr.org", "bob" $\leadsto$ "bob@iclr.org"}. While learning a program in $\mathcal{L}$ given by Table 2 that satisfies $\varphi$, it is clear right at the beginning of the search procedure that the rule transform:=atom does not apply. This is because any programs derived from transform:=atom can either extract a substring from the input or return a constant string, both of which fail to produce the desired output. Hence, only the transform:=Concat( . . . ) needs to be considered, thus significantly reducing the search space.

Similarly, consider another specification $\varphi$={"alice smith" $\leadsto$ "alice", "bob jones" $\leadsto$ "bob"}. In this case, the output appears to be a substring of input, thus selecting transform:=atom at the beginning of the search procedure is a better option than transform:=Concat( . . . ).

However, many such decisions are more subtle and depend on the ranking function h itself. For example, consider a specification $\varphi$={"alice liddell" $\leadsto$ "al", "bob ong" $\leadsto$ "bo"}. Now, both transform:=atom and transform:=Concat( . . . ) may lead to viable programs because the output can be constructed using the first two letters of the input (i.e., a substring atom) or by concatenating the first letters of each word. Hence, the branch that produces the best program is ultimately determined by the ranking function h since both branches generate valid programs.

The above examples show that to design a data-driven search strategy for branch selection, the subtle relationship between $\varphi$, h, and the candidate branch needs to be learned.

FIG. 1 is a system diagram for guiding real-time program synthesis in accordance with respective examples. Synthesizing a program may involve selecting a subprogram for a branch. The selected subprogram may be selected to be a highest-ranking subprogram. As there may be a large number of subprograms to select from, reducing the number of subprograms will decrease the amount of time to synthesize the program. In addition, a subprogram may include branches. Each of these branches have subprograms and synthesizing includes selecting a highest ranking of these subprograms. Accordingly, reducing the number of subprograms early on has a compounding effect in reducing the synthesizing time. In various examples, a score model is used to predict a subprogram's ranking. A synthesizer may use different score models based on the DSL of the program, the level of the branch, etc.

A score model selector 102 is used to select the score model to use for a set of subprograms. In an example, the level of branch associated with the subprogram is used to select the score model. For example, the score model may consider the effects of compounding branches within the subprogram, which would be impacted by the current level of the branch. Once a score model is selected, a scorer 104 may be used to score the subprograms of the current branch. The scorer 104 may use the current branch and the input-output examples to predict the ranking score for each of the subprograms.

A controller 106 may use the predicted scores to select the top k ranked subprograms. The controller 106 uses the predicted scores to avoid ranking each of the subprograms. Ranking each of the subprograms is similar in performance as to currently known systems. In contrast, the controller 106 may determine the highest predicted score from the subprograms. Then each subprogram whose predicted score is within a threshold from the maximum score are selected for ranking. As another example, the top-m predicted scores may be used, wherein m is greater than the number of subprograms that will be returned and less than n that is the total number of subprograms being analyzed. The controller 106 may use another approach where the subprograms are ranked in descending order based on the predicted scores. The top predicted subprogram is searched and the lowest score for the search is compared to the predicted score of the next subprogram. The predicted score is greater than the lowest score from the search, the next subprogram/branch is searched. In an example, the controller 106 selects the set of subprograms based on the branch level.

Regardless of the approach used by the controller 106, a set of subprograms is selected for ranking by a ranker 108, The ranker 108 may rank a subprogram based on how general the subprogram is. In an example, a more general subprogram is assumed to not be overfit to the provided specification. While the controller 106 may select every provided subprogram for ranking at some levels, the number of subprograms for ranking is less than the total number of subprograms provided to the controller 106. Not ranking all the subprograms is an example of how various embodiments are more efficient than previous solutions. A subprogram selector 110 selects the k-highest ranking subprograms. The k-highest ranking subprograms may then be returned and used for synthesizing the program.

As mentioned above, various embodiments predict one or more production rules that for a given specification $\phi$ will lead to a top-ranked program (as ranked a posteriori by h). Formally, given black-box access to h, a desired function $f$ is one that, $f(\Gamma, \varphi) \approx \max_{P \in S(\Gamma, \varphi)} h(P, \varphi)$ where $\Gamma$ is a production rule in $\mathcal{L}$, and $(\Gamma, \varphi)$ is a program set of all DSL programs derived from the rule $\Gamma$ that satisfy $\varphi$. In other words, the goal is to predict the score of the top-ranked $\varphi$-satisfying program that is synthesized by unrolling the rule $\Gamma$. In an example, the symbolic search of PROSE handles the construction of $(\Gamma, \varphi)$ and ensures that programs in it satisfy $\varphi$ by construction. The goal of $f$ is to optimize the score of a program derived from $\Gamma$ assuming this program is valid. If no program derived from $\Gamma$ can satisfy $\varphi$, $f$ should return a negative value, e.g., negative infinity. In an example, the production selection problem is a supervised learning problem, thus simplifying the learning task as opposed to end-to-end reinforcement learning solution.

Figure 2:
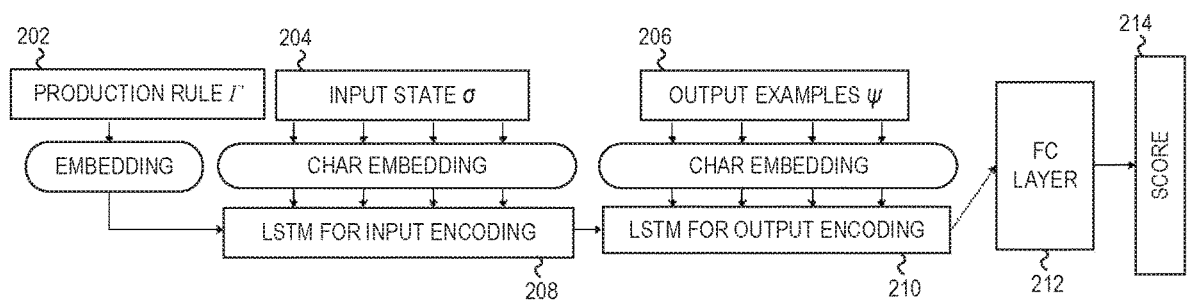
FIG. 2 shows a common structure of evaluated models in accordance with respective examples.

In various examples, two models for learning f were evaluated. The loss function for the prediction is given by: $L(f, \Gamma, \varphi) = (f(\Gamma, \varphi) - \max_{P \in S(\Gamma, \varphi)} h(P, \varphi))^2$. FIG. 2 shows a common structure of evaluated models. The structure is based on a standard multi-layer long short-term memory (LSTM) architecture. The structure involves embedding the given spec $\varphi$ that is made up of input states 204 and output examples 206, encoding the given production rule $\Gamma$ 202, and a feed-forward network that includes LSTM 208 for the input 204 and a long short-term memory 210 for the output examples 206. The output from the LSTMs 208 and 210 may be provided to a fully connected layer 212 that is used to output a score 214 $f(\Gamma, \varphi)$. In an example, the fully connected layer 212 includes two layers that are fully connected. One of the models attends over input when that model encodes the output, whereas the other model does not.

A score model f alone may not be sufficient to perfectly predict the branches that should be explored at every level. For example, consider a branching decision moment $N:=F_1(\ldots)\ldots F_n(\ldots)$ in a search process for the top k programs satisfying a spec $\varphi$. One approach to using the predictions of f is to always follow the highest-scored production rule $\text{argmax}_i f(F_i, \varphi)$. However, this means that any single incorrect decision on the path from the DSL root to the desired program will eliminate that program from the learned program set. If the search algorithm fails to produce the desired program by committing to a suboptimal branch anytime during the search process, then the analysis may never discover that such a program exists unless there is additional input-output example(s) supplied.

Thus, in an example, a branch selection strategy based on the predictions of f balances a trade-off of performance and generalization. Selecting too few branches (a single best branch in the extreme case) risks committing to an incorrect path early in the search process and producing a suboptimal program or no program at all. Selecting too many branches (e.g., all n branches in the extreme case) is no different from baseline PROSE and fails to exploit the predictions to improve performance.

Formally, a controller for branch selection at a symbol $N:=F_1(\ldots)|\ldots|F_n(\ldots)$ targeting k best programs may predict the expected score of the best program from each program set, $s_i = f(F_i, \varphi) \forall 1 \leq i \leq n$, and may use the predicted scores $s_i$ to narrow down the set of productions $F_1, \ldots, F_n$ to explore and to obtain the overall result by selecting a subset of generated programs. The pseudocode for two possible controllers is shown below in Tables 3 and 4. The controllers guide the search process to construct a most generalizable specification-satisfying program set S of size k given the f-predicted best scores s1, . . . , sn on the productions F1, . . . , Fn.

One controller is a threshold-based controller shown in Table 3. For this controller, a score threshold $\theta$ is fixed, and branches whose predicted score differ by at most $\theta$ from the maximum predicted score are explored. This is a simple extension of the naïve "argmax" controller discussed above that also explores any branches that are predicted "approximately as good as the best one". When θ=0, the controller operates as the "argmax" one.

TABLE 3

```
function ThresholdBased(φ, h, k, s1, . . ., sn)
    1:      Result set S* ← [ ]
    2:      i* ← argmaxi si
    3:      for all 1 ≤ i ≤ n do
    4:          if |si − si*| ≤ θ then
                    // recursive search
    5:              S* += LEARN(Fi, φ, k)
    6:      return the top k programs of S w.r.t. h
```

Another controller is based on a branch and bound technique in combinatorial optimization. The pseudocode for this controller is shown in Table 4. For this controller, the branches $F_i$ are ordered in the descending order of their respective predicted scores $s_i$. After recursive learning produces its program set $S_i$, the controller proceeds to the next branch only if $s_{i+1}$ exceeds the score of the worst program in $S_i$. Moreover, the target number of programs to be learned is reduced by using $s_{i+1}$ as a lower bound on the scores of the programs in $S_i$. That is, rather than relying blindly on the predicted scores, the controller guides the remaining search process by accounting for the actual synthesized programs as well.

TABLE 4

```
function BNBBASED(φ, h, k, s1 , . . . , sn)
    1:      Result set S* ← [ ];  Program target k'← k
    2:      Reorder Fi in the descending order of si
    3:      for all 1 ≤ i ≤ n do
    4:          Si ← LEARN(Fi, φ, k') // Recursive search
    5:          j ← BINARYSEARCH(si+1, Map(h, Si))
    6:          S* = Si* ∪ Si[0..j]; k' ← k' − j
    7:          if k' ≤ 0 then break
    8:      return S*
```

The various components described above may be combined into a unified algorithm for program synthesis. It builds upon the deductive search of the PROSE system, which uses symbolic PL insights in the form of witness functions to construct and narrow down the search space, and a ranking function h to pick the most generalizable program from the found set of specification-satisfying programs. However, the process is significantly sped up based on guiding the search process a priori at each branching decision using the learned score model f and a branch selection controller, outlined above. The resulting neural-guided deductive search (NGDS) keeps the symbolic insights that construct the search tree ensuring correctness of the found programs, but explores only those branches of this tree that are likely to produce the user-intended generalizable program, thus eliminating unproductive search time.

One idea in a NGDS is that the score prediction model f does not have to be the same for all decisions in the search process. It is possible to train separate models for different DSL levels, symbols, or even productions. This allows the model to use different features of the input-output specification for evaluating the fitness of different productions, and also leads to much simpler supervised learning problems.

Table 5 shows the pseudocode of an example NGDS. The pseudocode builds upon the deductive search of PROSE, but augments every branching decision on a symbol with some branch selection controller described above. Thus, Table 5 shows a neural-guided deductive search over $\mathcal{L}$ parameterized with a branch selection controller C.

TABLE 5

```
Given: DSL L, ranking function h, controller C (e.g., a controller from
Table 3 or Table 4), symbolic search algorithm LEARN(Production rule
Γ, specification φ, target k) as in PROSE with all recursive calls to
LEARN replaced with LEARNNGDS.
function LEARNNGDS(Symbol N := F1(...) | ... | Fn(...), specification
φ, target number of programs k)
    1:      if n = 1 then return LEARN(F1 , φ, k)
    2:      Pick a score model f based on depth(N, ℒ)
    3:      s1 , ..., sn ← f (F1 , φ), ..., f (Fn, φ)
    4:      return C(φ, h, k, s1 , ..., sn)
```

In an experiment, the NGDS algorithm was evaluated over the string manipulation domain with a DSL given by Table 2. Table 1 provides an example task for this DSL. The NGDS, its ablations, and baseline techniques were evaluated on two metrics: generalization accuracy on unseen inputs, and synthesis time.

In the experiment, a dataset of 375 tasks were collected from real-world customer string manipulation problems. These tasks were split into 65% training tasks, 15% validation tasks, and 20% test tasks. Some of the common applications found in the dataset included date/time formatting, manipulating addresses, modifying names, automatically generating email IDs, etc. Each task contained an average of 10 inputs, of which only one was provided as the specification to the synthesis system, mimicking industrial applications. The remaining unseen examples were re used to evaluate generalization performance of the synthesized programs.

The described NGDS was compared to two neural synthesis algorithms: RobustFill and DeepCoder. For RobustFill, the best-performing Attention-C model was used. In addition, the recommended DP-Beam Search with a beam size of 100 was used. Different beam sizes were also tried. For comparison, top program ranked according to the generated log-likelihood was selected. DeepCoder is a generic framework that allows their neural predictions to be combined with other synthesis methods. In one experiment, DeepCoder's predictions were combined with PROSE. The DeepCoder model was trained to predict a distribution over $\mathcal{L}$'s operators and used this model to guide PROSE synthesis. In addition, since RobustFill and DeepCoder were not optimized for generalization, their variants trained with 2 or 3 examples (denoted $RF_m$ and $DC_m$) were included for fairness, even though the m=1 example is the most important scenario in regard to real-life industrial usage.

As mentioned above, multiple prediction models and controllers may be used at various stages of the synthesis process. In an experiment, models that specialized in predictions for individual levels in the search process were evaluated. The model $T_1$ was trained for symbol transform, see Table 2, when expanded in the first level. Similarly, PP and POS refer to models trained for the pp and pos symbol, respectively. Three controllers: threshold-based (Thr), branch-and-bound (BB), and a combination of the two were evaluated. For the combination, the branch-and-bound controller used a 0.2 threshold predecessor ($BB_{0.2}$), were evaluated. In Tables 6 and 7 different model combinations are denoted as NGDS($f$, C) where $f$ is a symbol-based model and C is a controller. The final algorithm selection depended on its accuracy-performance trade-off. In Table 7, NGDS ($T_1$+POS, BB) is used, the best performing algorithm on the test set, although NGDS($T_1$, BB) performed slightly better on the validation set.

Generalization accuracy was one evaluation metric used and is the percentage of test tasks for which the generated program satisfies all unseen inputs in the task. Synthesis time was measured as the wall-clock time taken by a synthesis method to find the correct program, median over 5 runs. All the methods were run on the same machine with a 2.3 GHz Intel Xeon processor, 64 GB of RAM, and Windows Server 2016. The models were trained with CNTK over 100 (POS, PP) or 600 epochs.

Table 6 presents the generalization accuracy as well as synthesis time speed-up of various methods with respect to PROSE. Only times for tasks which require PROSE more than 0.5 seconds were compared. The accuracies were computed on a test set of seventy-three tasks. The speed-up metric was the geometric mean of per-task speed-up, ratio of synthesis time of PROSE and the method, when restricted to a subset of tasks with PROSE's synthesis time more than 0.5 seconds. Note that, with one example, NGDS and PROSE were significantly more accurate than RobustFill and Deep-Coder. This is natural as those methods were not trained to optimize generalization, and also highlights an advantage of a close integration with a symbolic system (PROSE) that incorporated deep domain knowledge. Moreover, on an average, NGDS saved nearly 50% of synthesis time over PROSE.

TABLE 6

| Metric | PROSE | DC1 | DC2 | DC3 | RF1 | RF2 | RF3 | NGDS |
|---|---|---|---|---|---|---|---|---|
| Accuracy (73%) | 67.12 | 32.88 | 39.73 | 42.47 | 16.44 | 26.03 | 35.65 | 68.49 |
| Speed-up (x PROSE) | 1.00 | 1.51 | 1.07 | 1.19 | 0.26 | 0.27 | 0.31 | 1.67 |

Table 7 presents the speed-up obtained by variations of the models and controllers. In addition to generalization accuracy and synthesis speed-up, Table 7 also show a fraction of branches that were selected for exploration by the controller. The disclosed embodiments obtained impressive speed-ups of >1.5 in sixteen cases, with more than a 10× speed-up in five test cases. One such test case where a 12× speed-up was obtained was a simple extraction case that is common in Web mining. The task was {"alpha,beta,charlie, delta"⤳"alpha"}. For such cases, the embodiment determined transform:=atom to be the correct branch (that leads to the final Substring based program) and hence saved time required to explore the entire Concat operator which was expensive. Another interesting test case where a 9.8 speed-up was observed was: {"457 124th St S, Seattle, Wash. 98111"⤳"Seattle-WA"}. This test case involved learning a Concat operator initially followed by Substring and Regex-Position operator. Again, the embodiment used in the experiment determined a correct branch that lead to the final program that did not need to explore all of the various branches.

All the models in Table 7 were run without attention. As measured by score flip accuracies (i.e., % of correct orderings of branch scores on the same level), attention-based models performed best, achieving 99.57/90.4/96.4% accuracy on train/validation/test, respectively (as compared to 96.09/91.24/91.12% for non-attention models). However, an attention-based model was significantly more computationally expensive at prediction time. Evaluating the attention-based model dominated the synthesis time and eliminated any potential speed-ups.

TABLE 7

| | Validation | | Test | | |
|---|---|---|---|---|---|
| Method | Accuracy | Speed-Up | Accuracy | Speed-Up | % of Branches |
| PROSE | 70.21 | 1 | 67.12 | 1 | 100 |
| NGDS(T1, Thr) | 59.57 | 1.15 | 67.12 | 1.27 | 62.72 |
| NGDS(T1, BB) | 63.83 | 1.58 | 68.49 | 1.22 | 51.78 |
| NGDS(T1, BB0.2) | 61.70 | 1.03 | 67.12 | 1.22 | 63.16 |
| NGDS(T1 + PP, Thr) | 59.57 | 0.76 | 67.12 | 0.97 | 56.41 |
| NGDS(T1 + PP, BB) | 61.70 | 1.05 | 72.60 | 0.89 | 50.22 |
| NGDS(T1 + PP, BB0.2) | 61.70 | 0.72 | 67.12 | 0.86 | 56.43 |
| NGDS(T1 + POS, Thr) | 61.70 | 1.19 | 67.12 | 1.93 | 55.63 |
| NGDS(T1 + POS, BB) | 63.83 | 1.13 | 68.49 | 1.67 | 50.44 |
| NGDS(T1 + POS, BB0.2) | 63.83 | 1.19 | 67.12 | 1.73 | 55.73 |

Figure 3:
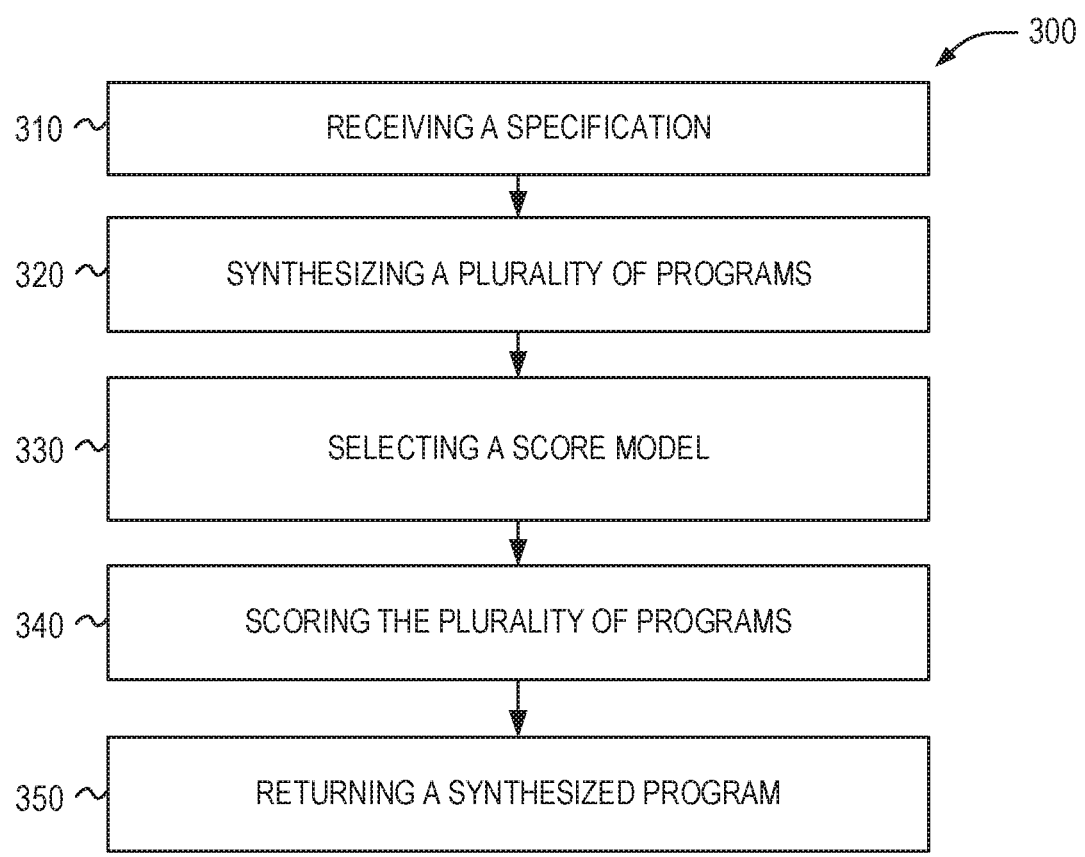
FIG. 3 shows a process for guiding real-time program synthesis in accordance with respective examples.

FIG. 3 shows a process for guiding real-time program synthesis in accordance with respective examples. At 310, a specification is received. The specification may include an input with the corresponding output. At 320, a plurality of synthesized programs are created that meet the specification. For example, each program that is provided with an input from the specification generates the corresponding out. Each program may include branching decisions. A branching decision has two or more paths. A path may be code that implements the branching decision. For example, a branching decision may be how to extract a substring. The branching decision may include a path that extracts the substring using regular expressions and another path that uses character positions. In addition, the branching decisions may be nested, such that a program has a branching decision within a path of a previous branching decision. At 330 a scoring model is selected. In an example, the scoring model is selected for a branching decision. Branching decisions within a program may be referred by its level within the program. A first-level branching decision is one without being nested within another branching decision. A second-level branching decision is a branching decision that is nested within a single branching decision. There may be third-level, fourth-level, etc., branching decisions within a program. A scoring model may be selected based on the level of the branching decision.

At 340, a synthesized program is scored based on the selected scoring model. For a particular branching decision, the highest ranking paths may be selected with the remaining paths removed. Removing paths decreases the synthesis speed by eliminating paths that are unlikely to lead to a correct synthesized program. The scoring functions used may be those described above. As a synthesized program may be only a part of a larger synthesized program, the synthesis process may by recursively repeated until a stopping condition. Accordingly, removing paths from an internal synthesized program will decrease the speed of synthesizing the final program. Eventually, the synthesis process will select one path for each branching decision to synthesize the final program. At 350, once the synthesis has completed, a synthesized program that meets the specification is returned.

Once synthesized, the program may be stored for later use. For example, the synthesized program may be used to format data from multiple columns within a spreadsheet. Once the program is synthesized, the program may be stored and ran to format data that was not provided with the specification.

Figure 4:
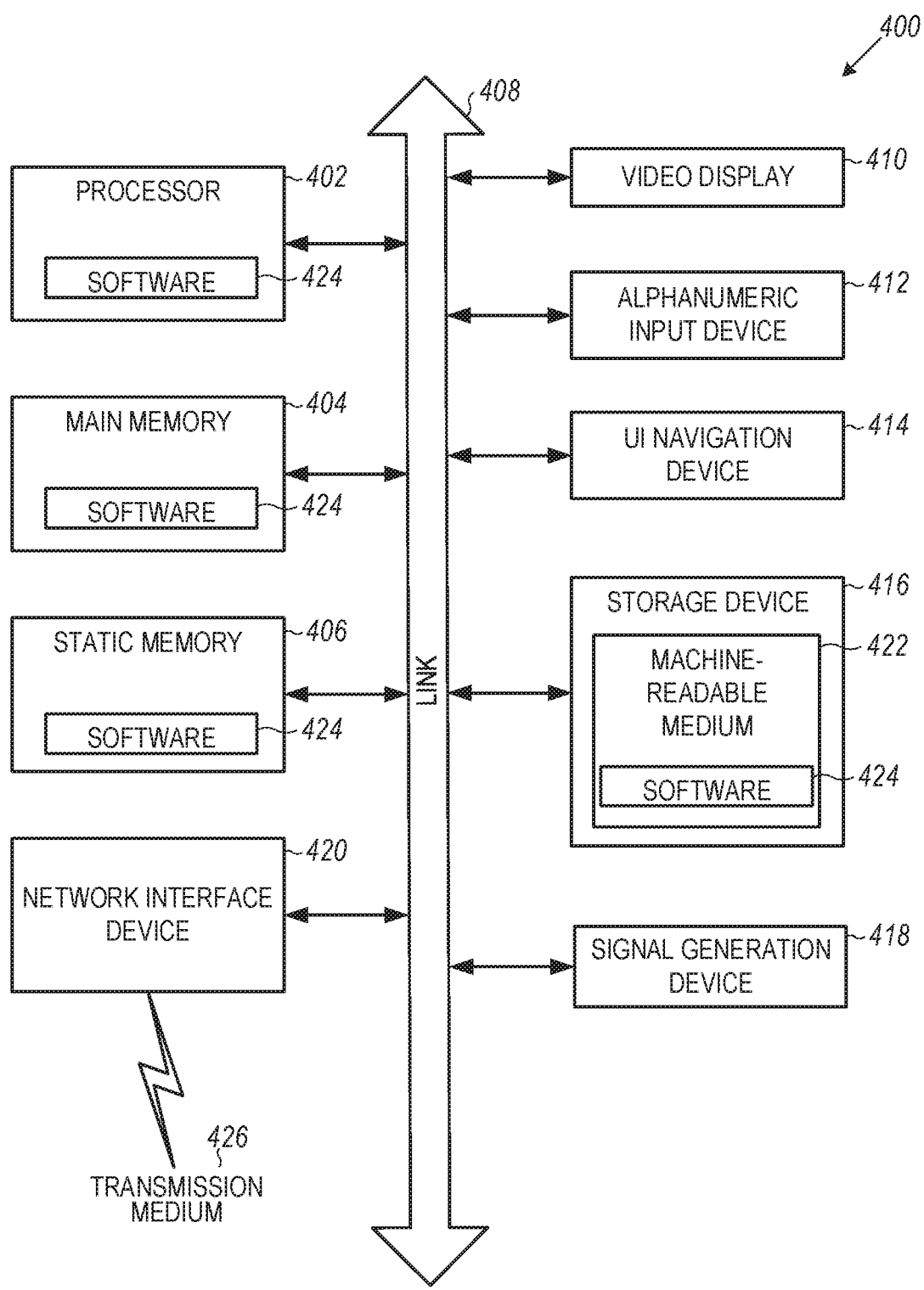
FIG. 4 is an example computing device that can be used in conjunction with the technologies described herein.

FIG. 4 is an example computing device that can be used in conjunction with the technologies described herein. In alternative embodiments, the computing device 400 may operate as a standalone device or may be connected (e.g., networked) to other computing devices. In a networked deployment, the computing device 400 may operate in the capacity of a server communication device, a client communication device, or both in server-client network environments. In an example, the computing device 400 may act as a peer computing device in peer-to-peer (P2P) (or other distributed) network environment. The computing device 400 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 400 may include a hardware processor 402 (e.g., a central processing unit (CPU), a graphics processing unit (GPU), a hardware processor core, or any combination thereof), a main memory 404 and a static memory 406, some or all of which may communicate with each other via a link (e.g., bus) 408. The computing device 400 may further include a display unit 410, an input device 412 (e.g., a keyboard), and a user interface (UI) navigation device 414 (e.g., a mouse). In an example, the display unit 410, input device 412, and UI navigation device 414 may be a touch screen display. In an example, the input device 412 may include a touchscreen, a microphone, a camera (e.g., a panoramic or high-resolution camera), physical keyboard, trackball, or other input devices.

The computing device 400 may additionally include a storage device (e.g., drive unit) 416, a signal generation device 418 (e.g., a speaker, a projection device, or any other type of information output device), a network interface device 420, and one or more sensors, such as a global positioning system (GPS) sensor, compass, accelerometer, motion detector, or other sensor. The computing device 400 may include an input/output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 416 may include a computing-readable (or machine-readable) storage media 422, on which is stored one or more sets of data structures or instructions 424 (e.g., software) embodying or utilized by any one or more of the techniques or functions described herein. In an example, at least a portion of the software may include an operating system and/or one or more applications (or apps) implementing one or more of the functionalities described herein. The instructions 444 may also reside, completely or at least partially, within the main memory 204, within the static memory 206, and/or within the hardware processor 204 during execution thereof by the computing device 200. In an example, one or any combination of the hardware processor 204, the main memory 204, the static memory 206, or the storage device 216 may constitute computing device (or machine) readable media.

While the computer-readable storage media 244 is illustrated as a single medium, a "computer-readable storage media" or "machine-readable storage media" may include a single medium or multiple media (e.g., a centralized or distributed database, and/or associated caches and servers) configured to store the one or more instructions 244.

In an example, a computer-readable storage media or machine-readable storage media may include any medium that is capable of storing, encoding, or carrying instructions for execution by the computing device 200 and that cause the computing device 200 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks: magneto-optical disks: Random Access Memory (RAM); and optical media disks. The computer-readable storage media is non-transitory in that the storage media does not consist of transitory propagating signals.

The instructions 244 may further be transmitted or received over a communications network 246 using a transmission medium via the network interface device 240 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 420 may use the transfer protocols to transmit data using transitory propagating signals.

In an example, the network interface device 420 may include one or more physical jacks (e.g., Ethernet, coaxial, or phone jacks) or one or more antennas to connect to the communications network 426. In an example, the network interface device 420 may include one or more wireless modems, such as a Bluetooth modem, a Wi-Fi modem or one or more modems or transceivers operating under any of the communication standards mentioned herein. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques. In an example, a transmission medium may include any intangible medium that is capable of storing, encoding or carrying instructions for execution by the computing device 400, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for guiding real-time program synthesis, the method comprising operations performed using an electronic processor, the operations comprising:
   receiving a specification comprising an input and output example;
   synthesizing a plurality of programs that meet the specification, wherein the synthesizing each of the plurality of programs comprises synthesizing subprograms for each of a plurality of levels of branching decisions in a search tree, wherein each branching decision comprises a plurality of paths, wherein synthesizing a plurality of programs comprises:
   selecting a first score model, for subprograms corresponding to a first branching decision;
   predicting a ranking score for each of the plurality of subprograms corresponding to the first branching decision using the first score model based on generalization of each program to unseen inputs;
   paring the plurality of subprograms corresponding to the first branching decision based on the ranking score to reduce branches of the search tree;
   ranking the pared subprograms based on a ranking function;
   selecting a set of top ranked subprograms from the pared subprograms corresponding to the first branching decision;
   repeating the selecting of a score model, predicting a score, paring, ranking, and selecting a subprogram at each level of the search tree; and
   creating a synthesized program that meets the specification, wherein the synthesized program comprises one of the top ranked subprograms from each level of the search tree.

2. The method of claim 1, wherein the first score model is selected based on a level of the branching decision, the effects of compounding search tree branches from a current branching decision, and wherein the plurality of programs are from a domain specific language (DSL) set of target programs.

3. The method of claim 1, wherein predicting a ranking score for each of the plurality of subprograms using the first score model comprises:
   embedding the specification for the synthesized program;
   inputting an input state of the branching decision into a long short-term memory (LSTM)) unit;
   inputting an output example of the branching decision into the LSTM unit, wherein the LSTM produces an output based on the input state and the output example; and
   inputting the output of the LSTM to a fully connected layer of a neural network, wherein an output of the neural network is the score from the first score model.

4. The method of claim 1, further comprising:
   determining possible valid rules based on the input and output example;
   determining possible invalid rules based on the input and output example; and
   constructing a first plurality of paths for the first branching decision based on the possible valid rules and the possible invalid rules.

5. The method of claim 1, the method further comprising:
   ranking each of the plurality of subprograms using a neural-guided search algorithm that predicts the best program scores from each branch;
   determining a ranking threshold based on the ranking of each of the plurality of subprograms; and
   filtering out any of the plurality of subprograms whose ranking is below the ranking threshold.

6. A system for guiding program synthesis, the system comprising:
   an electronic processor:
   a memory including instructions that configured the electronic processor to:
   receive a specification comprising an input and output example;
   synthesize a plurality of programs that meet the specification, wherein the synthesizing each of the plurality of programs comprises a plurality of branching decisions in a search tree, wherein each branching decision comprises a plurality of paths, wherein synthesizing a plurality of programs comprises:
   select a first score model, for subprograms corresponding to a first branching decision;
   predict a ranking score for each of the subprograms corresponding to the first branching decision using the first score model based on generalization of each program to unseen inputs;
   pare the plurality of subprograms corresponding to the first branching decision based on the ranking score to reduce branches of the search tree;
   rank the pared subprograms based on a ranking function;
   select a set of top ranked subprograms from the pare subprograms corresponding to the first branching decision;
   repeat the selection of a score model, predicting a score, paring, ranking, and selecting a subprogram at each level of the search tree; and
   create a synthesized program that meets the specification, wherein the synthesized program comprises one of the top ranked subprograms from each level of the search tree.

7. The system of claim 6, wherein the first score model is selected based on a level of the branching decision.

8. The system of claim 6, wherein predicting a ranking score for each of the plurality of subprograms using the first score model the electronic processor is further configured to:

embed the specification for the synthesized program;
input an input state of the branching decision into a long short-term memory(LSTM) unit;
input an output example of the branching decision into the LSTM unit, wherein the LSTM produces an output based on the input state and the output example; and
input the output of the LSTM to a fully connected layer of a neural network, wherein an output of the neural network is the score from the first score model.

9. The system of claim 6, wherein the electronic processor is further configured to:
determine possible valid rules based on the input and output example;
determine possible invalid rules based on the input and output example; and
construct a first plurality of paths for the first branching decision based on the possible valid rules and the possible invalid rules.

10. The system of claim 6, wherein the electronic processor is further configured to:
rank each of the plurality of subprograms;
determine a ranking threshold based on the ranking of each of the plurality of subprograms; and
filter out any of the plurality of subprograms whose ranking is below the ranking threshold.

11. A computer-readable storage-medium storing computer-executable instructions for guiding real-time program synthesis, the stored instructions comprising:
instructions to receive a specification comprising an input and output example;
instructions to synthesize a plurality of programs that meet the specification, wherein the synthesizing each of the plurality of programs comprises synthesizing subprograms for each of a plurality of levels of branching decisions in a search tree, wherein each branching decision comprises a plurality of paths, wherein synthesizing a plurality of programs comprises:
instructions to select a first score model, for subprograms corresponding to a first branching decision;
instructions to predict a ranking score for each of the subprograms corresponding to the first branching decision using the first score model based on generalization of each program to unseen inputs;
instructions to pare the plurality of subprograms corresponding to the first branching decision based on the ranking score to reduce munches of the search tree;
instructions to rank the pared subprograms based on a ranking function;
instructions to select a set of top ranked subprograms from the pared subprograms corresponding to the first branching decision;
instruction to repeat the selection of a score model, predicting a score, paring, ranking, and selecting a subprogram at each level of the search tree; and
instructions to create a synthesized program that meets the specification, wherein the synthesized program comprises one of the top ranked subprograms from each level of the search tree.

12. The computer-readable storage-medium of claim 11, wherein the first score model is selected based on a level of the branching decision.

13. The computer-readable storage-medium of claim 11, wherein the instructions to predict a score each of the plurality of subprograms using the first score model comprise:
instructions to embed the specification for the synthesized program;
instructions to input an input state of the branching decision into a long short-term memory(LSTM) unit;
instructions to input an output example of the branching decision into the LSTM unit, wherein the LSTM produces an output based on the input state and the output example; and
instructions to input the output of the LSTM to a fully connected layer of a neural network, wherein an output of the neural network is the score from the first score model.

14. The computer-readable storage-medium of claim 11, wherein the instructions further comprise:
instructions to determine possible valid rules based on the input and output example;
instructions to determine possible invalid rules based on the input and output example; and
instructions to construct a first plurality of paths for the first branching decision based on the possible valid rules and the possible invalid rules.

* * * * *